Figure 1:
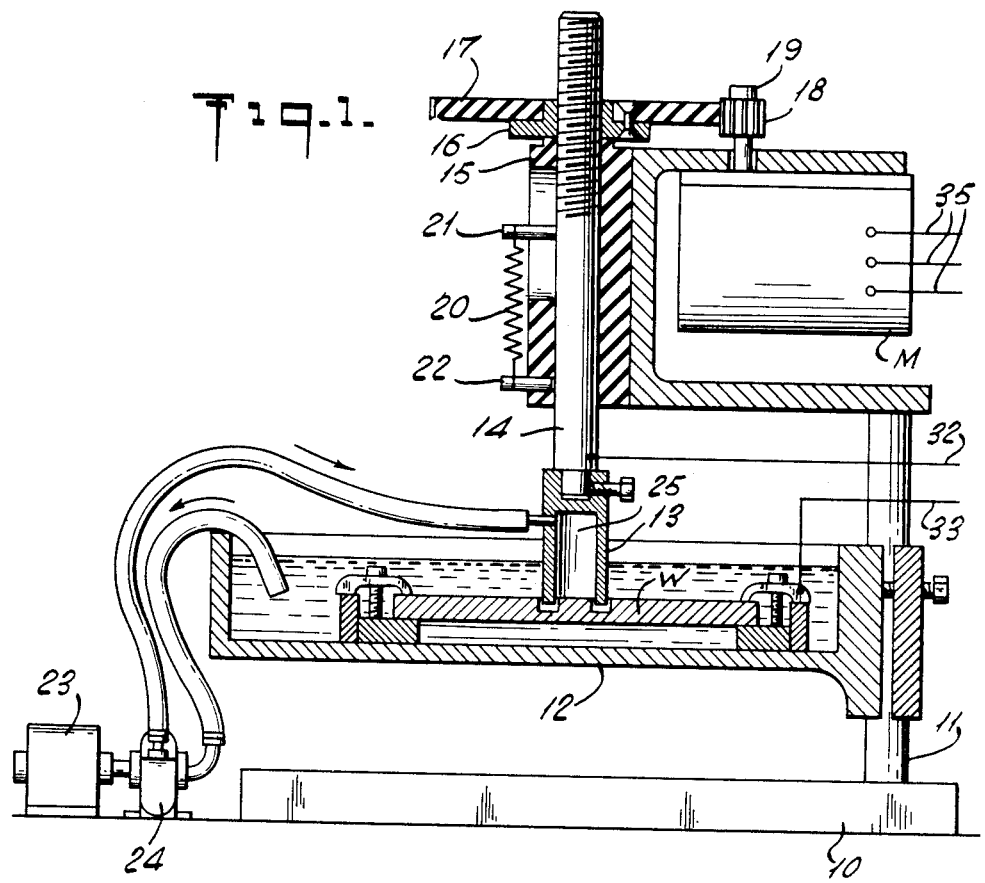

Feb. 2, 1965    M. J. RIDDLES    3,168,638
METHOD OF ELECTRO-DISCHARGE MACHINING
AND FLUIDS FOR USE THEREIN
Filed June 19, 1962

INVENTOR.
MILTON J. RIDDLES
BY
Curtis Morris & Safford
ATTORNEYS

United States Patent Office 3,168,638
Patented Feb. 2, 1965

3,168,638
METHOD OF ELECTRO-DISCHARGE MACHINING AND FLUIDS FOR USE THEREIN
Milton J. Riddles, Cincinnati, Ohio, assignor to The Cincinnati Milling Machine Co., Cincinnati, Ohio, a corporation of Ohio
Filed June 19, 1962, Ser. No. 203,611
5 Claims. (Cl. 219—69)

This invention relates to electro-discharge machining and more particularly to a method of electro-discharge machining wherein a novel machining fluid is used to achieve improved machining efficiency.

As is well known in the machining art, electro-discharge machining is carried out by applying a high frequency voltage of the order of 50 to 600 volts across an electrode and closely spaced work piece with an essentially nonconductive machining fluid in the gap therebetween in such manner that electrical discharges from electrode to the work piece occur in short bursts to remove metal from predetermined areas of the work piece. The machining fluid performs a number of different functions in this process. Thus the fluid is ordinarily caused to flow continuously through the gap between the electrode and work piece to entrain and remove physically from the machining area particles of metal detached from the work piece and electrode. The flow of machining fluid also serves to cool the surfaces being machined. Commonly the machining fluid is filtered and recirculated to the machining area. The machining fluids previously used comprise hydrocarbon oils, silicone oils and related materials.

In addition to its cooling and entrainment function, the machining fluid participates actively in the metal removal operation. Thus the fluid must be sufficiently nonconductive to cause the desired voltage to build up across the gap between the electrode and the work piece and sufficiently conductive at elevated voltages to insure the occurrence of an electrical discharge for each voltage cycle.

One of the factors that has retarded the development of electro-discharge machining is the relatively high rate at which electrodes are consumed in this process. In some cases the quantity of metal removed from the electrode has been almost as great as the quantity removed from the work piece. In general, the efficiency of the electro-machining process as measured by the ratio of metal removed from the work piece to metal removed from the electrode has been relatively low. This ratio will be referred to in the present specification as the metal removal efficiency.

It is an object of the present invention to provide an electro-discharge machining process having a substantially higher metal removal efficiency than prior processes. It is another object of the invention to provide an electro-discharge machining process wherein machining fluids are employed that have not previously been used in such processes and that provide improved metal removal efficiency in such processes. It is still another object of the invention to provide a novel class of machining fluids which when employed in previous known types of electrodischarge machining operations result in improved metal removal efficiency. Other objects of the invention will be in part obvious and in part pointed out hereafter.

The present invention is based on the discovery that a substantial improvement in metal removal efficiency of an electro-discharge machining operation of the type referred to above can be achieved by using, in place of the oils previously used, a machining fluid which is essentially an aqueous solution of a glycol of the general formula $HOCH_2(CH_2OCH_2)_nCH_2OH$ wherein $n$ is 0 to 25 and a monohydroxy compound having the general formula ROH wherein "R" is a hydrocarbon radical of 4 to 12 carbon atoms. It has been found that when such aqueous solutions are used as machining fluids, a substantial increase in machining rate results, and metal removal efficiencies can be obtained that are several times as great as those achieved with oils of the type previously proposed for this application. The present compositions are especially advantageous when used in conjunction with tools composed of a relatively soft metal, such as brass, which is often used in electro-discharge machining operations.

The machining fluids of the present invention preferably comprise from 35% to 70% by volume of the glycol or polyglycol, from 2.5% to 35% by volume of the monohydroxy compound and from 5% to 35% by volume of water. Glycols that may be used include ethylene, diethylene, and triethylene glycols, as well as higher glycols including solid glycols such as those sold under the tradename Carbowax. The preferred glycols are those having molecular weights within the range 100 to 300.

As indicated by the specific examples given below, the monohydroxy compound may be a saturated or unsaturated aliphatic alcohol having the requisite number of carbon atoms, or it may be an aromatic compound such as phenol, phenylethanol or a cresol.

Commercial machining fluids prepared according to the present invention may contain, in addition to the principal constituents refered to above, various special purpose ingredients in small quantities. For example, the compositions may include a conventional rust inhibitor such as an alkanolamine, fatty acid amide or soap to the extent of say 0.5% to 2.5% by volume. Also a surface active agent may be added in an amount up to a few percent to assist in maintaining the particles of detached metal in suspension until they have been removed from the area of the tool and work piece.

Figure 2:
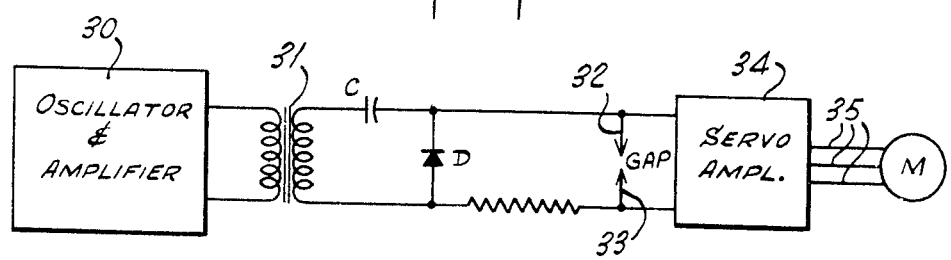

In order to point out more fully the nature of the present invention, a number of specific examples are given below of illustrative formulations of machining fluids embodying the invention and data concerning the operating effectiveness of these fluids. These formulations were evaluated in apparatus of the type shown in the accompanying drawing wherein:

FIGURE 1 is a diagrammatic elevation of an electrodischarge machining apparatus, taken partly in section axially of the electrode, and FIGURE 2 is a diagram of an electrical circuit used to supply electrical energy to the machining apparatus.

Referring to the drawing, the apparatus there shown comprises a stand 10 having an upright 11 on which is secured a machining tank 12. The work piece W is suitably clamped in place near the bottom of the tank so as to lie beneath a tool or electrode 13. The electrode is attached to the lower end of a feed rod 14 which is vertically slidable in a bushing 15 made of non-conductive material. The upper end of the rod 14 is threaded to receive a nut 16 carrying a gear wheel 17 made of a non-conductive material. Gear 17 is driven by spur gear 18 mounted on a shaft 19 rotated by a servomotor M. The construction is such that servomotor M varies the vertical position of electrode 13 to maintain a predetermined small gap between the lower end of the electrode and the machined surface of the work piece.

The rod 14 is biased downwardly to hold nut 16 against the top of bushing 15 by a spring 20 which is normally in tension and is connected at its ends to the pin 21 on rod 14 and the pin 22 mounted in bushing 15. A motor 23 drives a pump 24 which withdraws machining fluid from the tank 12 and delivers it under pressure to the bore 25 in the electrode 13, whence it flows through the gap between the electrode and work piece and into the tank.

Electrical energy for the apparatus is provided by a variable frequency oscillator and amplifier unit 30 which delivers either a sine wave or a square wave output to the primary winding of an output transformer 31. This transformer may be constructed with multiple secondary windings (not shown) which can be connected in various combinations to permit impedance matching between the amplifier and the spark generating circuit. The alternating current provided by the transformer 31 is delivered through a capacitor C and a resistor R to leads 32 and 33 connected to the electrode and work piece, respectively. A silicon rectifier or diode D is connected in shunt across the gap and resistor R to permit charging of the capacitor on one half cycle and to place twice the charging voltage across the gap on the next half cycle. This causes a spark discharge to take place across the gap, thereby discharging the capacitor which is again charged on the next half cycle.

The average gap voltage is sensed by a servoamplifier 34 and compared with a reference voltage. The difference in voltage, if any, is amplified and fed through leads 35 to the electric servomotor M to drive it in the proper direction to restore the gap voltage to the desired value as determined by the reference voltage. In this way the electrode 13 is fed toward or away from the work piece to maintain the gap constant.

In gathering the data given in the examples, a square wave input was used at a frequency of 20 kc. and a maximum current of 15 amps. Condenser C had a capacity of 40 mfd. and R had zero resistance. The machining tools used in all examples were 0.5 in. diameter brass rods, and the work pieces were AISI 1018 steel. The quantities of the several ingredients of the machining fluids are given in parts by volume.

The fluids disclosed herein were also tested on a commercial type of electro-discharge machining apparatus and were found to give results comparable to those obtained with equipment of the type described above. The metal removal efficiency values given in the examples are, as indicated above, the volumetric ratios of metal removed from the work piece to metal removed from the tool. Values for "machining rate" are in terms of cubic inches of metal removed per ampere-minute multiplied by $10^4$.

In order to provide a basis for comparing the efficiencies and machining rates obtained with the present compositions with those of the prior art compositions, runs were made using several conventional machining fluids in the same apparatus and under the same conditions used in obtaining the data given in the specific examples. The results of these tests with prior machining fluids are as follows:

| Machining Fluid | Efficiency | Machining Rate |
| --- | --- | --- |
| Hydrocarbon oil (SOHIO Spin 60) | 2.8 | 2.5 |
| Hydrocarbon oil (ELOX No. 6) | 2.7 | 2.7 |
| n-Hexane | 2.0 | 1.9 |

Example 1
Component: Amount
- Diethylene glycol _____ 70.0
- 2 methyl-3-butyn-2-ol _____ 2.5
- Water _____ 25.0
- Surface active agent (Renex 20) _____ 2.5

Metal removal efficiency _____ 6.4
Machining rate _____ 5.3

Example 2
Component: Amount
- Polyethylene glycol (M.W. 200) _____ 65.0
- 1-phenylethanol _____ 17.0
- Water _____ 17.0
- Surface active agent (Renex 30) _____ 0.5
- Triethanolamine _____ 0.5

Metal removal efficiency _____ 17.0
Machining rate _____ 5.5

Example 3
Component: Amount
- Triethylene glycol _____ 50.0
- n-Butanol _____ 25.0
- Water _____ 22.0
- Surface active agent (glyceryl mono-oleate) 2.0
- Diethanolamine _____ 1.0

Metal removal efficiency _____ 34.0
Machining rate _____ 4.7

Example 4
Component: Amount
- Polyethylene glycol (M.W. 400) _____ 60.0
- Phenol _____ 10.0
- Water _____ 27.5
- Triethanolamine _____ 2.5

Metal removal efficiency _____ 6.6
Machining rate _____ 5.6

Example 5
Component: Amount
- Tetraethylene glycol _____ 45.0
- 2-phenylethanol _____ 20.0
- Water _____ 31.5
- Surface active agent (Renex 20) _____ 1.5
- Isopropyl amine _____ 2.0

Metal removal efficiency _____ 27.0
Machining rate _____ 7.1

Example 6
Component: Amount
- Polyethylene glycol (M.W. 200) _____ 70.0
- 4-methylpentan-2-ol _____ 20.0
- Water _____ 5.0
- Surface active agent (GAFAC RM 710, Antara) _____ 2.5
- Rust inhibitor (Alrosol 0) _____ 2.5

Metal removal efficiency _____ 6.4
Machining rate _____ 3.3

Example 7
Component: Amount
- Tetraethylene glycol _____ 45.0
- p-Cresol _____ 20.0
- Water _____ 31.5
- Surface active agent (Renex 20) _____ 1.5
- Diethanolamine _____ 2.0

Metal removal efficiency _____ 35.0
Machining rate _____ 7.8

Example 8
Component: Amount
- Triethylene glycol _____ 35.0
- n-Pentanol _____ 30.0
- Water _____ 32.0
- Surface active agent (Renex 30) _____ 1.0
- Monoethanolamine _____ 2.0

Metal removal efficiency _____ 29.0
Machining rate _____ 4.4

From the foregoing examples it should be apparent that superior metal removal efficiencies and machining rates can be attained by using the machining fluids of the present invention. The machining fluids disclosed herein not only provide high metal removal efficiencies but other advantages as well. Thus when machining fluids of the present type are employed, a stable arc is achieved sooner than with hydrocarbon oils and a more nearly complete usage of arc frequency with fewer misses is achieved. The removed metal particles settle out of the present fluids well and can be more readily filtered therefrom. Also the present fluids provide a wider variety of properties to meet varying machining requirements. A related group of machining fluids is disclosed and claimed in application Serial No. 202,481, filed by applicant jointly with Josephine L. Williams on June 14, 1962.

It is of course to be understood that the foregoing examples are intended to be merely illustrative and that numerous changes can be made in the ingredients, proportions and conditions set forth therein without departing from the spirit of the present invention as defined in the appended claims.

I claim:

1. An electro-discharge machining fluid consisting essentially of from 35% to 75% by volume of an ethylene glycol of the formula $HOCH_2(CH_2OCH_2)_nCH_2OH$ wherein $n$ is selected from 0 and the positive integers from 2.5% to 35% by volume of a compound of the formula $ROH$ wherein $R$ is a hydrocarbon radical of 4 to 12 carbon atoms, and from 5% to 35% by volume of water.

2. An electro-discharge machining fluid according to claim 1 wherein said ethylene glycol is a polyethylene glycol of molecular weight 150 to 300.

3. An electro-discharge machining fluid according to claim 1 and containing a minor proportion of alkanolamine as a rust inhibitor.

4. The method of electro-discharge machining which comprises passing high frequency electrical discharges of short duration from an electrode to a work piece to be machined while said electrode and work piece are immersed in a machining fluid essentially composed of an aqueous solution of ethylene glycol of the formula $HOCH_2(CH_2OCH_2)_nCH_2OH$ wherein $n$ is selected from 0 and the positive integers and a monohydroxy compound of the formula $ROH$ wherein $R$ is a hydrocarbon radical having 4 to 12 carbon atoms, said solution containing from 35% to 70% by volume of said glycol and from 2.5% to 35% by volume of said monohydroxy compound.

5. A method of electro-discharge machining which comprises passing high frequency electrical discharges of short duration from an electrode to a work piece to be machined while said electrode and work piece are immersed in a machining fluid as defined in claim 1.

References Cited in the file of this patent

UNITED STATES PATENTS

| | | |
|---|---|---|
| 2,526,423 | Rudorff | Oct. 17, 1950 |
| 2,590,927 | Brandt et al. | Apr. 1, 1952 |
| 2,884,313 | Browne | Apr. 28, 1959 |
| 2,962,577 | Webb | Nov. 29, 1960 |

OTHER REFERENCES

Williams, R. O.: "Elements of Electro-Discharge Machining," page 5, Oct. 10, 1957.

"Mechanical Engineering," page 153, copr. 1961, U.S. Dept. of Commerce (OTS 60–51089).

4th edition (1950), "Condensed Chemical Dictionary," F. M. Turner, page 532, Reinhold Pub. Corp., New York, N.Y.